(12) United States Patent
Lin

(10) Patent No.: US 7,554,633 B2
(45) Date of Patent: Jun. 30, 2009

(54) METHOD OF MANUFACTURING A SEMI-TRANSPARENT TYPE LIQUID CRYSTAL DISPLAY PANEL

(75) Inventor: George Lin, Taoyaung Shein (TW)

(73) Assignee: AU Optronics Corporation, Hsin-Chu (TW)

( * ) Notice: Subject to any disclaimer, the term of this patent is extended or adjusted under 35 U.S.C. 154(b) by 394 days.

(21) Appl. No.: 11/280,338

(22) Filed: Nov. 17, 2005

(65) Prior Publication Data
US 2006/0066784 A1    Mar. 30, 2006

Related U.S. Application Data

(62) Division of application No. 10/781,662, filed on Feb. 20, 2004, now abandoned.

(30) Foreign Application Priority Data
Sep. 12, 2003    (TW) ............................. 92125283 A

(51) Int. Cl.
G02F 1/1335 (2006.01)
G02F 1/13 (2006.01)

(52) U.S. Cl. ........................................ 349/114; 349/187

(58) Field of Classification Search .......... 349/113–114, 349/187, 106–109
See application file for complete search history.

(56) References Cited

U.S. PATENT DOCUMENTS

| 6,798,473 B2 * | 9/2004 | Kaneda et al. ............... 349/106 |
| 2007/0013840 A1 * | 1/2007 | Baek ........................... 349/114 |

* cited by examiner

*Primary Examiner*—Dung T. Nguyen
(74) *Attorney, Agent, or Firm*—Harold L. Novick; Stanley N. Protigal; The Nath Law Group

(57) ABSTRACT

A method of producing a semi-transparent type LCD panel provides an LCD panel with reflected light transmitting through a transmissive portion of a passivation layer having the same color density. The semi-transparent type LCD panel mainly comprises a transparent substrate, a first transparent conductive layer, a first alignment layer, a liquid crystal layer, a second alignment layer, a second transparent conductive layer, a color filter layer, a passivation layer, and a TFT array substrate. A reflection layer is formed on a portion of the passivation layer. The area of the passivation layer not covered with the reflection layer is etched to a certain depth. The passivation layer has two different levels of thickness so as to allow reflected transmitting lights to be of the same color density.

10 Claims, 3 Drawing Sheets

METHOD OF MANUFACTURING A SEMI-TRANSPARENT TYPE LIQUID CRYSTAL DISPLAY PANEL

CROSS REFERENCE TO RELATED APPLICATION

This application is a division of U.S. patent application Ser. No. 10/781,662, filed Feb. 20, 2004, now abandoned and claims priority from Taiwanese Patent Application No. 092125283, filed on Sep. 12, 2003, the entire contents of which are incorporated by reference.

BACKGROUND OF THE INVENTION

1. Field of the Invention

The present invention relates to a semi-transparent type liquid crystal display panel and method of manufacturing the same. More particularly, the present invention relates to a liquid crystal display panel capable of attaining an identical predetermined color performance by using the thickness differences within a passivation layer and method of manufacturing the panel.

2. Description of the Prior Art

At art of present, semi-transparent type liquid crystal display devices are of many kinds of designs, most of which separate the color filter and the TFT array on two different substrates. Therefore, in order to regulate hue difference caused by luminosity differences between the transparent portion and the reflection portion of the semi-transparent type liquid crystal display device, the color filter needs to be adjusted to deal with the hue difference. The current methods have the following steps: (1) adjusting the areas of the transparent section and the reflection portion with different shapes and proportions to coat the color filter and (2) using different densities of an identical color photoresist to coat the color filter photoresist. However, these methods must have two spreading steps or even two exposure-development steps due to the use of different color filters with different materials. Alternatively, these methods must have to adjust the thickness or areas of the transparent section and the reflection portion of the color filter. This not only wastes materials, but also increases the cycle time. Furthermore, the production volume and the resulting precision are not satisfactory.

SUMMARY OF THE INVENTION

Therefore, the present invention has been made in view of the above problems in the conventional liquid crystal display devices. One objective of the present invention is to provide a simple and material-saving method for liquid crystal display panel.

The present invention provides a method for producing a semi-transparent type liquid crystal display (LCD) panel. The LCD panel comprises a transparency substrate, a TFT array substrate, a liquid crystal layer, a passivation layer, a reflection layer, and a flat color filter. The liquid crystal layer is between the transparency substrate and the TFT array substrate. The passivation layer having a transmissive portion and a reflection portion is formed on the TFT array substrate, where a thickness of the reflection portion is thicker than that of the transmissive portion. The reflection layer is formed on the reflection portion of the passivation layer. The flat color filter is formed on the reflection layer and the transmissive portion of the passivation layer. A first light reflected by the reflection layer and a second light transmitting through the transmissive portion of the passivation layer have the same color density.

The present invention also provides a method for manufacturing a semi-transparent type liquid crystal panel. The method comprises the following steps. First, a passivation layer is formed on a TFT array substrate. Next, a reflection layer is formed on the portion of the passivation layer. The passivation layer not covered by the reflection layer is partially etched as a transmissive portion. Then, a flat color filter is formed on the passivation layer and the reflection layer. A first transparent conductive layer and a first alignment layer are formed on the flat color filter in sequence. Finally, the TFT array substrate and a transparency substrate having a second transparent conductive layer and a second alignment layer are fabricated into an LCD panel, where a liquid crystal layer is between the TFT array substrate and the transparency substrate. A first light reflected by the reflection portion and a second light transmitting through the transmissive portion of the passivation layer have the same color density.

The present invention also provides another method for manufacturing a semi-transparent type liquid crystal panel using a different stacking sequence. The method comprises the following steps. First, a passivation layer is formed on a TFT array substrate. Next, a reflection layer is formed on the portion of the passivation layer. The passivation layer not covered by the reflection layer is partially etched as a transmissive portion. Then, a first transparent conductive layer is formed on the passivation layer and the reflection layer. A flat color filter and a first alignment layer are formed on the transparent conductive layer in sequence. Finally, the TFT array substrate and a transparency substrate having a second transparent conductive layer and a second alignment layer are fabricated into an LCD panel, where a liquid crystal layer is between the TET array substrate and the transparency substrate. A first light reflected by the reflection portion and a second light transmitting through the transmissive portion of the passivation layer have the same color density.

BRIEF DESCRIPTION OF THE DRAWINGS

The present invention can be more fully understood by reference to the following description and accompanying drawings, in which.

DESCRIPTION OF THE PREFERRED EMBODIMENT

Figure 1:
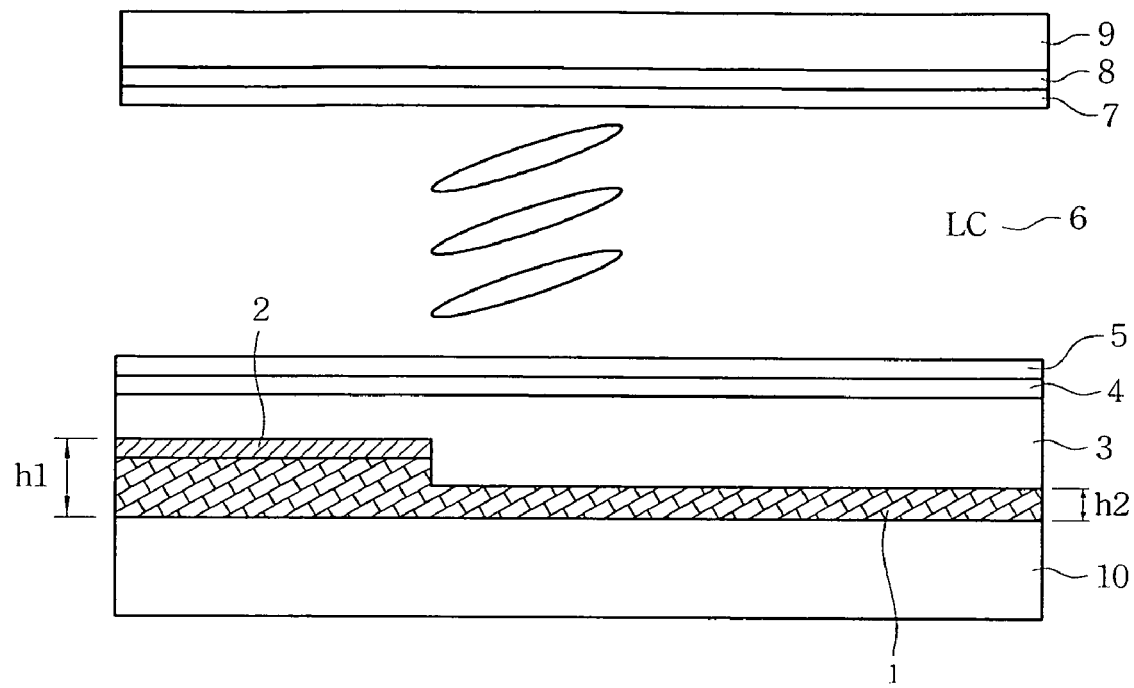
FIG. 1 is a schematic cross sectional view, showing a structure of a liquid crystal display panel of a preferred embodiment according to the present invention.

First, please refer to FIG. 1. FIG. 1 is a schematic cross sectional view, and shows a structure of a liquid crystal display panel of a preferred embodiment according to the present invention. The LCD panel mainly comprises elements of a TFT array substrate 10, a passivation layer 1, a flat color filter layer 3, a first transparent conductive layer 4, a first alignment layer 5, a liquid crystal layer 6, a second alignment layer 7, a second transparent conductive layer 8, and a transparent substrate 9. The elements are stacked one by one in sequence from top to bottom or vice versa. A reflection layer 2 is formed on the passivation layer 1 and the material thereof is a reflective metal, such as aluminum, silver, chromium, aluminum alloy, and chromium alloy. Then, the passivation layer 1 not covered with the reflection layer 2 is etched to a certain depth, so the passivation layer 1 may have two different levels of thickness, i.e., of h1 and h2, to allow reflecting and transmitting light in the same visual color density. Here, the thicknesses of h1 and h2 can be calculated through hue simulation of primary colors red, green, and blue.

Figure 2:
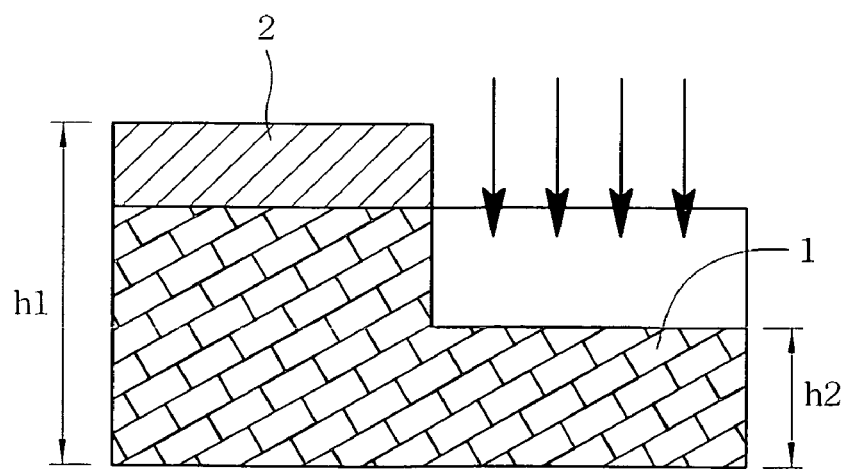
FIG. 2 is a schematic view, showing a practice that a certain depth of a passivation layer is etched according to the present invention.
Figure 3:
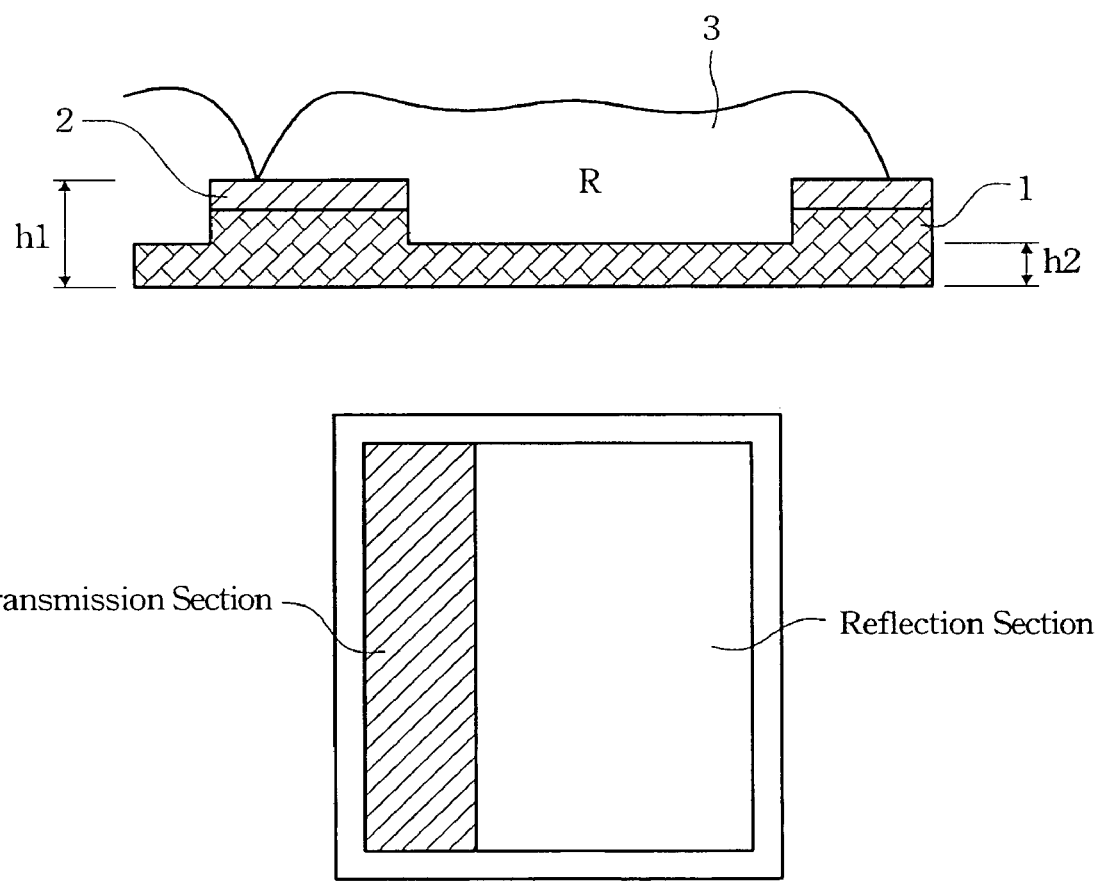
FIG. 3 is a schematic vertical view, showing a practice that a flat color filter is formed on a passivation layer having two different levels of thickness according to the present invention.

Next, please refer to FIG. 2. FIG. 2 is a schematic view, and shows a practice that a certain depth of the passivation layer 1 is etched according to the present invention. Also, the color filter layer 3 (not shown in FIG. 2) is formed on the TFT array substrate 10 in the present invention. First, the passivation layer 1 is formed on the TFT array substrate 10. Then, a reflection layer 2 is formed on a portion of the passivation layer 1. Next, a portion of the passivation layer 1 unprotected by the reflection layer 2 is etched to a predetermined depth (i.e., the altitude level h2 shown in FIG. 2), where the predetermined depth is determined according to the type of the color filter. Therefore, the passivation layer 1 has different levels of thickness, i.e., h1 and h2. Next, as shown in FIG. 3, the flat color filter layer 3, such as a photoresist layer with pigment, is formed on the passivation layer 1 and the reflection layer 2 by spin coating, spinless coating, transferring, or printing. Therefore, the flat color filter layer 3 has different levels of thickness because the passivation layer 1 has different levels of thickness, and the reflected and transmitted lights have equal color density when seen. Under such circumstances, compared with the conventional arts, the color filter layer 3 is a single layer of one time formation, and is not two layers with different pigments or levels of thickness formed respectively on the reflection portion and the transmissive portion.

Next, referring to FIG. 1, there are the first transparent conductive layer 4, the first alignment layer 5, the liquid crystal layer 6, the second alignment layer 7, the second transparent conductive layer 8, and the transparent substrate 9, stacked on the color filter sequentially from bottom to top or vice versa. A complete LCD panel is thus formed. As mentioned above, the reflection layer 2 on the passivation layer 1 not only functions as a protection layer or a mask when the passivation layer 1 is etched, but also achieves the reflective characteristic.

Figure 4:
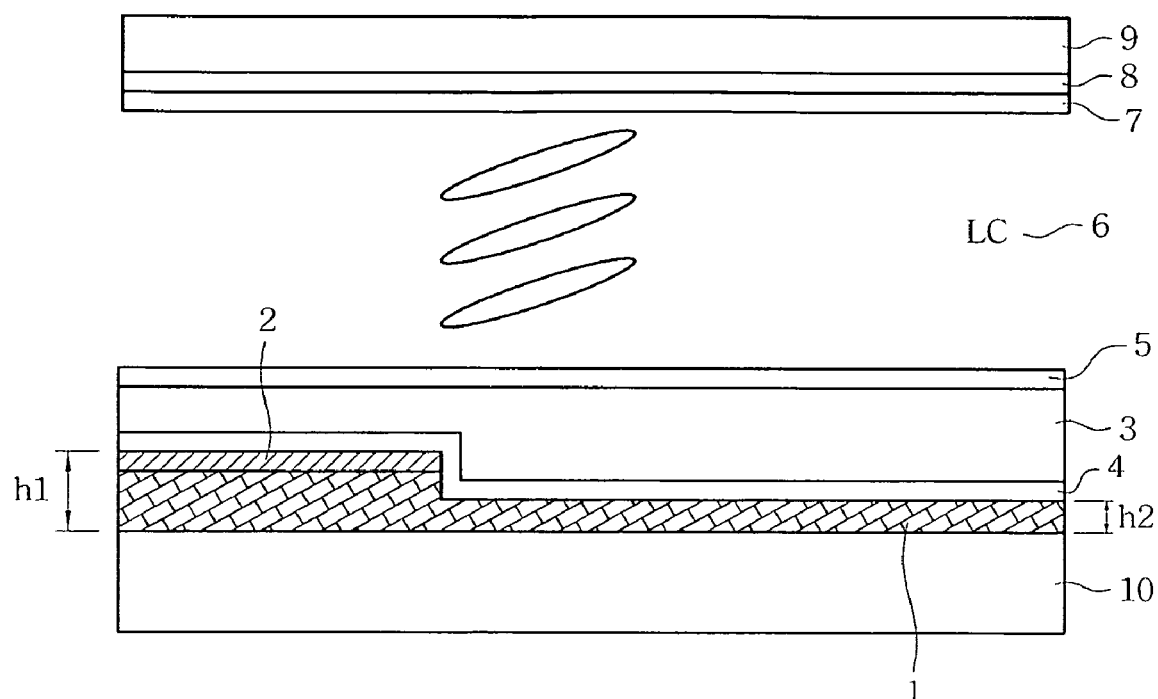
FIG. 4 is a schematic cross sectional view, showing a structure of a liquid crystal display panel of another preferred embodiment according to the present invention.

Finally, please refer to FIG. 4. FIG. 4 is a schematic cross sectional view, and shows a structure of an LCD panel of another preferred embodiment according to the present invention. The LCD panel mainly comprises a TFT array substrate 10, a passivation layer 1, a first transparent conductive layer 4, a flat color filter layer 3, a first alignment layer 5, a liquid crystal layer 6, a second alignment layer 7, a second transparent conductive layer 8, and a transparent substrate 9, which are stacked one by one in sequence from top to bottom or vice versa. Similarly, a reflection layer 2 is formed on the partial area of the passivation layer 1, such as aluminum, silver, chromium, aluminum alloy, and chromium alloy. Then, a portion of the passivation layer 1 not covered with the reflection layer 2 is etched to a predetermined depth to form two different levels of thickness, i.e., h1 and h2, in the passivation layer 1. The area of the thicker passivation layer 1 is used as a reflection portion and the area of the thinner passivation layer 1 is used as a transmissive portion. Therefore, the visual color densities on the reflection portion and the transmissive portion are the same after a flat color filter is formed on the passivation layer 1. Here, the h1 and h2 levels of thickness can be calculated through hue simulation according to primary colors of R, G, and B.

The main difference between FIG. 1 and FIG. 4 lies in that the stacking sequence of the first transparent conductive layer 4 and the color filter layer 3 is interchanged. Namely, the color filter layer 3 is formed below the first transparent conductive layer 4 and the first alignment layer 5 as shown in FIG. 1, while in FIG. 4, the color filter layer 3 is between the first transparent conductive layer 4 and the first alignment layer 5. The above difference does not limit the present invention.

What is claimed is:

1. A method for manufacturing a semi-transparent type liquid crystal panel, comprising:

forming a passivation layer on a TFT array substrate;

forming a reflection layer on a partial section of said passivation layer as a reflection portion;

etching other section of said passivation layer without being covered by said reflection layer to a predetermined depth as a transmissive portion by using the reflection layer as a mask;

forming a flat color filter on said transmissive portion of said passivation layer and said reflection layer;

forming a first transparent conductive layer and a first alignment layer on said flat color filter in sequence; and fabricating said TFT array substrate and a transparency substrate having a second transparent conductive layer and a second alignment layer, and a liquid crystal layer between said TFT array substrate and said transparency substrate into an LCD panel;

wherein, a thickness of said reflection portion and a thickness of said transmissive portion are calculated through a hue simulation of primary red, green and blue colors, and a first light reflected by said reflection portion and a second light transmitting through said transmissive portion of said passivation layer have the same color density.

2. The method according to claim 1, wherein said reflection layer is aluminum, silver, chromium, aluminum alloy, or chromium alloy.

3. The method according to claim 1, wherein said flat color filter is a photoresist with pigments.

4. The method according to claim 1, wherein said flat color filter is formed by spin coating, spinless coating, transferring, or printing.

5. The method according to claim 1, wherein said flat color filter is thinner on said reflection portion than on said transmissive portion.

6. A method for manufacturing a semi-transparent type liquid crystal panel, comprising:

forming a passivation layer on a TFT array substrate;

forming a reflection layer on a partial section of said passivation layer as a reflection portion;

etching other section of said passivation layer without being covered by said reflection layer to a predetermined depth as a transmissive portion by using the reflection layer as a mask;

forming a first transparent conductive layer on said transmissive portion of said passivation layer and said reflection layer;

forming a flat color filter on said first transparent conductive layer;

forming a first alignment layer formed on said flat color filter; and fabricating said TFT array substrate and a transparency substrate having a second transparent conductive layer and an second alignment layer, and a liquid crystal layer being between said TFT array substrate and said transparency substrate into an LCD panel;

wherein, a thickness of said reflection portion and a thickness of said transmissive portion are calculated through a hue simulation of primary red, green and blue colors, and a first light reflected by said reflection portion and a second light transmitting through said transmissive portion of said passivation layer have the same color density.

7. The method according to claim 6, wherein said reflection layer is aluminum, silver, chromium, aluminum alloy, or chromium alloy.

8. The method according to claim 6, wherein said flat color filter is a photoresist with pigments.

9. The method according to claim 6, wherein said flat color filter is formed by spin coating, spinless coating, transferring, or printing.

10. The method according to claim 6 wherein said flat color filter is thinner on said reflection portion than on said transmissive portion.

* * * * *